United States Patent
Rea

(10) Patent No.: US 6,406,041 B1
(45) Date of Patent: Jun. 18, 2002

(54) SHOPPING CART HAVING ADDITIONAL STORAGE CAPACITY

(75) Inventor: Gerlad M. Rea, Auburn Hills, MI (US)

(73) Assignee: Patent Holding Company, Fraser, MI (US)

( * ) Notice: Subject to any disclaimer, the term of this patent is extended or adjusted under 35 U.S.C. 154(b) by 10 days.

(21) Appl. No.: 09/608,775

(22) Filed: Jun. 30, 2000

(51) Int. Cl.[7] .................................................. B62B 3/14
(52) U.S. Cl. ........................... 280/33.992; 280/DIG. 4; 280/35
(58) Field of Search ................. 280/33.991, 33.992, 280/33.993, 33.995, 33.996, 33.997, 638, 35, 651, 652, DIG. 4; 220/486, 489, 505; 232/19; 248/99

(56) References Cited

U.S. PATENT DOCUMENTS

| | | | |
|---|---|---|---|
| 432,254 A | * | 7/1890 | Taylor .......................... 232/19 |
| 1,510,103 A | * | 9/1924 | Perkins ........................ 220/505 |
| 2,662,661 A | | 12/1953 | Goldman |
| 2,845,729 A | * | 8/1958 | Baumgart ..................... 40/308 |
| 3,157,871 A | * | 11/1964 | Umanoff ....................... 340/539 |
| 3,375,018 A | * | 3/1968 | Close ................... 280/33.991 |
| 3,460,850 A | * | 8/1969 | Franklin ..................... 220/486 |
| 3,497,234 A | * | 2/1970 | Schray .................. 280/33.993 |
| 3,534,973 A | | 10/1970 | Elliott |
| 3,787,987 A | * | 1/1974 | Brass ......................... 434/178 |
| 3,802,620 A | * | 4/1974 | Ferrara ........................ 232/19 |
| 3,813,111 A | * | 5/1974 | Ruger .................... 280/33.991 |
| 3,885,806 A | * | 5/1975 | Trubiano ............... 280/33.993 |
| 4,376,502 A | | 3/1983 | Cohen |
| 4,560,180 A | * | 12/1985 | Ulmer ................... 280/33.993 |
| 5,366,123 A | | 11/1994 | Range |
| 5,494,308 A | | 2/1996 | Southerland |
| 5,542,687 A | | 8/1996 | Harris |
| 5,544,904 A | * | 8/1996 | Maher ..................... 280/47.35 |
| 5,961,133 A | * | 10/1999 | Perry .................... 280/33.993 |
| 6,126,181 A | * | 10/2000 | Ondrasik ............... 280/33.991 |

* cited by examiner

Primary Examiner—Brian L. Johnson
Assistant Examiner—Bridget Avery
(74) Attorney, Agent, or Firm—Brooks & Kushman P.C.

(57) ABSTRACT

A shopping cart which is nestable with other conventional shopping carts and has a front storage compartment disposed at a front end oft the cart. The front storage compartment provides for additional storage capacity to the cart without occupying the space of a main compartment of the cart in which the main compartment may contain selected items. The shopping cart includes a front end having upper and lower portions through which the storage compartment is disposed. The front storage compartment is pivotally connected to the shopping cart at the lower portion. The front storage compartment is easily pivoted fore with respect to the front end of the cart to define an open or added storage position. In gathering and nesting the cart with other carts, the front storage compartment is easily pivoted aft with respect to the front end to define a closed or stowed position.

13 Claims, 2 Drawing Sheets

SHOPPING CART HAVING ADDITIONAL STORAGE CAPACITY

TECHNICAL FIELD

The present invention relates to a shopping cart which has available additional storage capacity and is nestable with other shopping carts.

BACKGROUND ART

There is a need to increase the storage capacities of shopping carts, such as grocer carts. However, replacing carts currently owned by a merchant with new shopping carts imposes high costs to the merchant without a guarantee of substantial returns. In addition to the purchase of new carts, the costs may include resizing storage racks located throughout a premises in which the carts are used, purchasing accessories for cart storage, or adjusting the dimensions between each cashier station.

Moreover. merely purchasing additional shopping carts having greater dimensional features than current shopping carts imposes a problem to the merchant in the process of gathering and nesting the carts together. Shopping carts are usually gathered and nested together by manually pushing the front of one cart into the rear of another cart. Generally shopping carts have a rear panel which is pivotable to an upwardly folding position for storage of a group of carts in customary fashion. Typically, since the rear of one cart complements the front of another cart in order to be nested together, this type of nesting cannot be performed with carts having different dimensions.

Thus, what is needed is an improved shopping cart having additional storage capacity.

What is also needed is an improved shopping cart which is easily gathered and nested.

What is also needed is an improved shopping cart which may be nested with conventional shopping carts.

DISCLOSURE OF INVENTION

It is an object of the present invention to provide for an improved shopping cart having additional Storage capacity and nestable with other shopping carts. In one embodiment, the shopping cart comprises a front end having upper and lower portions, and a storage compartment pivotally connected to the lower portion of the cart. The storage compartment is configured to manually pivot fore with respect to the front end defining an added storage position outside the shopping cart and configured to automatically pivot aft with respect to the front end defining a stowed position within the shopping cart when nested with another shopping cart.

In particular, the shopping cart comprises a front end having upper and lower portions, cud a storage compartment pivotally connected to the lower portion of the front end. The storage compartment has a pin and slot arrangement between the upper portion of the front end of the cart and the top of the storage compartment to guide pivotal movement of the storage compartment fore and aft with respect to the front end. The storage compartment is manually pivotable fore with respect to the front end to define an added storage position outside the shopping cart and automatically pivotable aft with respect to the front end to define a stowed position within the shopping cart when nested with another shopping cart.

More specifically, the shopping cart comprises a front end having upper and lower portions, and a storage compartment pivotally connecting to the lower portion of the cart by a fixed pivot pin. The front end of the cart has a stop pin in the upper portion and the storage compartment has a track or slot to receive the stop pin to which the storage compartment attaches to guide pivotal movement of the storage compartment fore and aft with respect to the front end. The storage compartment is manually pivotable fore with respect to the front end to define an added storage position outside the shopping cart and automatically pivotable aft with respect to the front end to define a stowed position within the shopping cart when nested with another shopping cart.

The above object and other objects, features, and advantages of the present invention are readily apparent from the following detailed description of the best mode for carrying out the invention when taken in connection with the accompanying drawings.

BEST MODE FOR CARRYING OUT THE INVENTION

The present invention provides for a shopping cart which is nestable with other conventional shopping carts and has a front storage compartment disposed at a front end of the cart. The front storage compartment provides for additional storage capacity to the cart without occupying the space of a main compartment of the cart, wherein the main compartment may contain selected items. The front storage compartment is easily pivoted fore with respect to the front end of the cart to define an open or added storage position. In gathering and nesting the cart with other carts, the front storage compartment is easily pivoted aft with respect to the front end to define a closed or stowed position.

Figure 1:
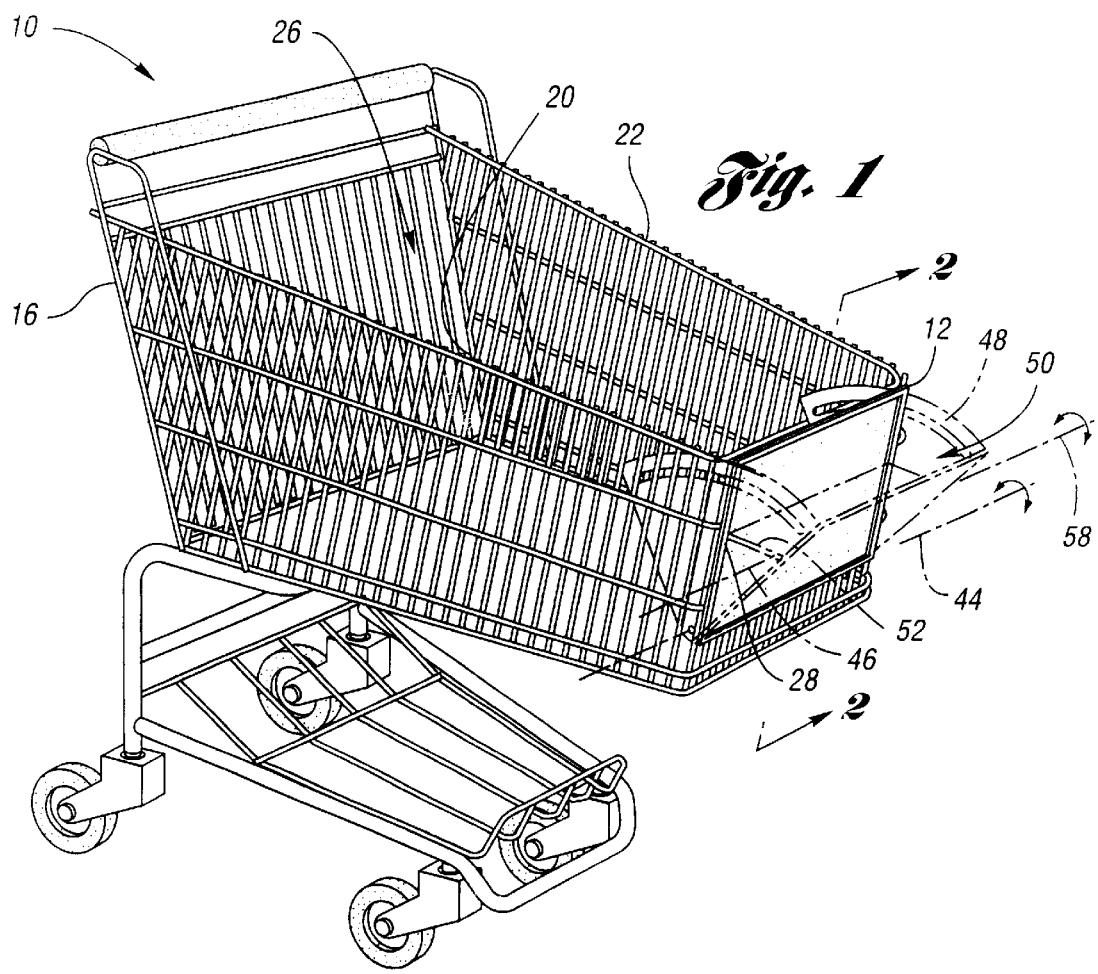
FIG. 1 is a perspective view of a shopping cart having a front storage compartment in accordance with the present invention.
Figure 2:
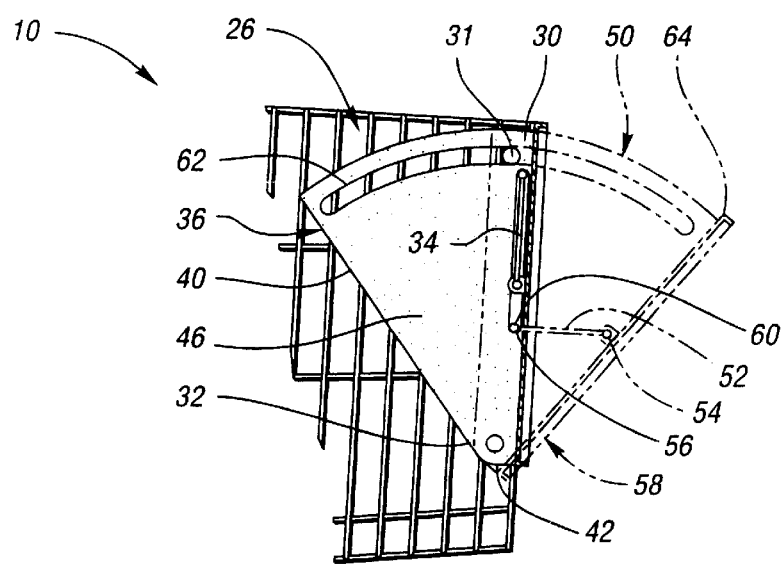
FIG. 2 is a fragmentary side view of the shopping cart depicting the front storage compartment of FIG. 1 in its storage position (solid lines) and nested position (dashed lines)
Figure 3:
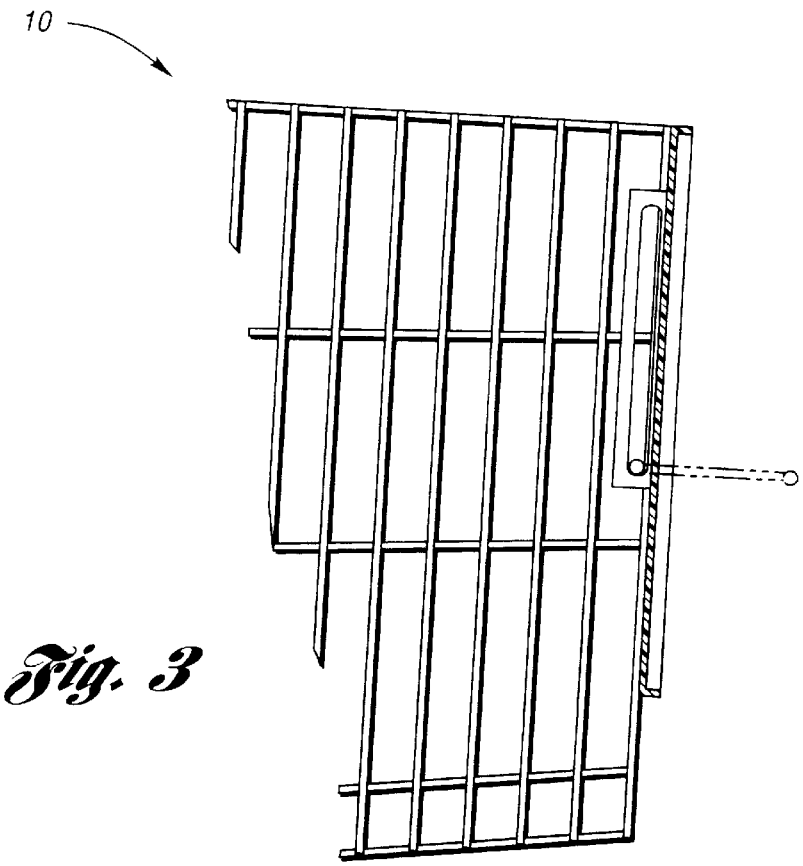
FIG. 3 is an enlarged view of the circle of FIG. 2.

FIG. 1 illustrates shopping cart 10 in accordance with the present invention. As show, shopping cart 10 includes front and rear ends 12, 16 and lateral frames 20, 22 and bottom wall 23 which integrally connect front and rear ends 12, 16 together to define main storage compartment 26. FIGS. 1 and 2 depict front end 12 having opening 28 formed therethrough. Opening 28 defines upper and lower portions 30, 32. As shown in FIGS. 2 and 3, upper portion 30, includes extensions or pins 31 which extend laterally inward to oppose each other. As show, vertical slots 34 are formed between upper and lower portions 30, 32 to define a length or slidably track or pin and slot arrangement.

FIG. 2 further illustrates front storage compartment 36 which is pivotally attached to lower portion 32 of front end 12. More specifically, front storage compartment 36 includes front and rear frames 38, 40, each having bottom ends which are connected to define closed bottom 42 of front storage compartment 36. Side frames 46, 48 are vertically disposed between front and rear frames 38, 40 to further connect frames 38, 40. Side frames 46, 48 are laterally disposed with respect to front end 12 of cart 10. The configuration of frames 38, 40, 46, 48 define open top 50. Closed bottom 42 pivotally attaches to lower portion 32 by a fixed pivot pin to define a first axis about which front storage compartment 36 may pivot. Closed bottom 42 pivotally attaches to lower portion 32 by any suitable means. For example, lower portion 32 may have a pivot pin transversely formed thereon about which a hook or loop of closed bottom 42 attaches for pivotal movement. Other ways of pivotally attaching closed bottom 42 to lower portion 32 do not fall beyond the scope or spirit of the invention.

Moreover, front storage compartment 36 includes bottom support 52 which, in the open position, is horizontally disposed between front and rear frames 38, 40 and adjacent the bottom of front storage compartment 36. Bottom support 52 has first and second ends or portions 54, 56. First end 54 pivotally connects to front frame 38 to define a second axis about which bottom support pivots as compartment 36 pivotally moves fore and aft with respect to front end 12. First end 54 pivotally connects to front frame 38 by any suitable means. For example, front frame 38 may have a bar transversely formed thereon about which a hook or loop of first end 54 attaches for pivotal movement. Other ways of pivotally attaching first end 54 to front frame 38 does not fall beyond the scope or spirit of the invention.

As shown in FIG. 2 and 3, second end 56 includes top pins or legs 60 which extend laterally therefrom, each of which slidably inserts through one of the vertical slots 34. Legs 60 are slidable along length 35 of vertical slots 34. As front storage compartment 36 pivots about first axis 44 fore and aft with respect to front end 12, first end 54 pivots about second axis 58 and second end 56 slides across length 35. Thus, when storage compartment 36 is in the stowed position, bottom support 52 is disposed substantially vertically along the length 35 of vertical slots 34. Moreover, when storage compartment 36 is in the added storage position, bottom support 52 is disposed substantially horizontally between front and rear frames 40, 42 of front storage compartment 36.

Front storage compartment 36 further includes a pair of arcuate tracks or pin and slot arrangements 62 which are laterally disposed on side frames 46, 48, respectively. Front storage compartment 36 is located in opening 28 of front end 12 such that extensions 31 insert through and cooperates with tracks 62 to guide pivotal movement of front storage compartment 36 about first axis 44. It is to be noted that cooperation between tracks 62 and extensions 31 may be configured in any suitable fashion. For example, tracks 62 may be disposed inside main storage compartment 26 adjacent front end 12 on lateral frames 20, 22, respectively. In cooperation therewith, extensions may be formed on side frames 46, 48, respectively.

Moreover, front storage compartment 36 also includes snap 64 which maintain sufficient frictional bias with front end 12 of cart 10 in order to retain compartment 36 in the stowed position and provides easy release from front end 12 for pivotal movement of compartment 36 to the added storage position. It is to be noted that snap 64 may be any suitable mechanism that maintains sufficient frictional bias with front end 12 of cart 10 and provides easy release for pivotal movement of compartment 36 from front end 12.

Figure 4:
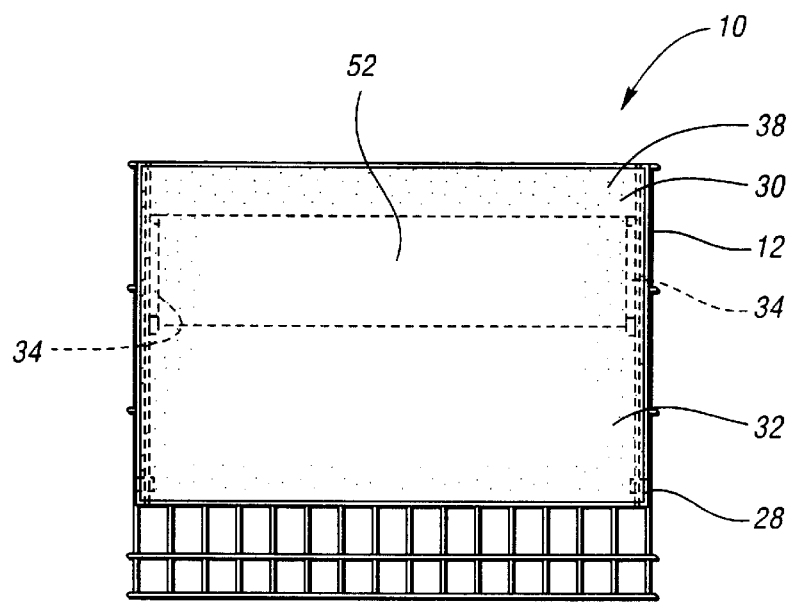
FIG. 4 is a plan view of the front end of the shopping cart partly in section to show the pivotal connection of the compartment and cart in accordance with the present invention.

As shown in FIG. 2 and 4, front storage compartment 36 is configured to manually pivot lore with respect to the front end in the added storage position outside the shopping cart. Compartment 36 is also configured to automatically pivot aft with respect to front end 12 in the stowed position within cart 10 when nested with another shopping cart. Thus, when nested with a plurality of other shopping carts, shopping cart 10 may receive the front end of another shopping cart (not shown). Moreover, front end 12 of cart 10 may be received by the rear end of a third shopping cart (not shown). As such, front storage compartment 36 retracts back to the stowed position at contact and force against the third shopping cart. Compartment 36 is sufficiently biased to front end 12 such that it will remain in the stowed position until force is placed against the bias to manually pivot compartment 36 fore with respect to front end 12.

The front storage compartment may be made of any suitable material, for example reticulated metal rods, high density polymers, composite materials. The shopping cart may also be made of any suitable, conventional material, such as reticulated metal rods, high density polymers, composite materials. Other materials used would not fall beyond the scope or spirit of this invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A shopping cart having additional storage capacity, the shopping cart nestable with other shopping carts, the shopping cart comprising:

a front end having upper and lower portions;

a storage compartment being pivotally connected to the lower portion of pivotal movement fore and aft with respect to the front end, wherein the storage compartment further includes opposing front and rear frames connected together at bottom ends to define a closed bottom of the storage compartment, the closed bottom pivotally connected to the lower portion of the front end to define a first axis;

a pair of side frames vertically disposed between the front and rear frames to further connect the front and rear frames, the side frames laterally disposed with respect to the front end of the cart; and a bottom support horizontally disposed between the front and rear frames and adjacent the bottom of the storage compartment, the bottom support having first and second ends, the first end pivotally connected to the front frame to define a second axis and the second end slidably connected to the front end of the cart to define a length along which the second end slides, wherein the first end pivots about the second axis and the second end slides along the length as the storage compartment pivots about the first axis fore and aft with respect to the front end;

the storage compartment configured to be manually pivotable fore with respect to the front end to an additional storage position outside the shopping cart and configured to be automatically pivotable aft with respect to the front end to a stowed position within the shopping cart when nested with another shopping cart.

2. The shopping cart of claim 1 including a pin and track to guide pivotal movement of the storage compartment fore and aft with respect to the front end, the storage compartment having one of the pin and track and the front end having the other of the pin and track.

3. The shopping cart of claim 1 wherein the second end includes legs extending laterally therefrom and the front end further includes a pair of vertical slots formed thereon, each leg slidably inserted through one slot, the slots having the length along which the legs slide.

4. The shopping cart of claim 1 wherein the storage compartment further includes a snap, the snap configured to maintain sufficient friction with the front end of the cart to retain the storage compartment in the stowed position and to allow pivotal movement of the storage compartment from the front end to the added storage position.

5. A shopping cart nestable with other shopping carts, the shopping cart comprising:

a front end having upper and lower portions; and a storage compartment pivotally connected to the lower portion, the storage compartment having a pin and slot arrangement between the upper portion of the front end of the cart and the top of the storage compartment to guide pivotal movement of the storage compartment fore and aft with respect to the front end, wherein the storage compartment further includes opposing front and rear frames connected together to define a closed bottom of the storage compartment, the closed bottom pivotally connected to the lower portion of the front end to define a first axis;

the storage compartment manually pivotable fore with respect to the front end to define an added storage position outside the shopping cart and automatically pivotable aft with respect to the front end to define a stowed position within the shopping cart when nested with another shopping cart.

6. The shopping cart of claim 5 wherein the storage compartment further includes:

a pair of side frames vertically disposed between the front and rear frames to further connect the front and rear frames, the side frames laterally disposed with respect to the front end of the cart; and a bottom support horizontally disposed between the front and rear frames and adjacent The bottom of the storage compartment, the bottom support having first and second portions, the first portion pivotally connected to the front frame to define a second axis and the second portion slidably connected to the rear frame to define a length along which the second portion slides, wherein the first portion pivots about the second axis and the second portion slides across the length as the storage compartment pivots about the first axis fore and aft with respect to the front end.

7. The shopping cart of claim 5 wherein the storage compartment further includes a snap for maintaining sufficient friction With the front end of the cart to retain the storage compartment in the stowed position and for allowing pivotal movement of the storage compartment from the front end to the added storage position.

8. The shopping cart of claim 6 wherein the second portion includes legs extending laterally from the bottom support and the rear frame further includes a vertical slot formed thereon, the legs slidably inserted through the slot having the length along which the legs slide.

9. A shopping cart nestable with other shopping carts, the shopping cart comprising:

a front end having upper and lower portions; and a storage compartment pivotally connected to the lower portion of the front end by a fixed pivot pin, the front end of the cart having a stop pin in the upper portion and the storage compartment having a track to receive the stop pin to which the storage compartment attaches to guide pivotal movement of the storage compartment fore and aft with respect to the front end, the storage compartment manually pivotable fore with respect to the front end to define an added storage position outside the shopping cart and automatically pivotable aft with respect to the front end to define a stowed position within the shopping cart when nested with another shopping cart.

10. The shopping cart of claim 9 wherein the storage compartment further includes opposing front and rear frames connected together to define a closed bottom of the storage compartment, the closed bottom pivotally connected to the lower portion of the front end to define a first axis.

11. The shopping cart of claim 9 wherein the storage compartment further includes a snap for maintaining sufficient friction with the front end of the cart to retain the storage compartment in the stowed position and for allowing pivotal movement of the storage Compartment from the front end to the added storage position.

12. The shopping cart of claim 10 wherein the storage compartment further includes:

a pair of side frames vertically disposed between the front and rear frames to further connect the front and rear frames, the side frames laterally disposed with respect to the front end of the cart; and a bottom support horizontally disposed between the front and rear frames and adjacent the bottom of the storage compartment, the bottom support having first and second portions, the first portion pivotally connected to the front frame to define a second axis and the second portion slidably connected to the rear frame to define a length along which the second portion slides, wherein the first portion pivots about the second axis and the second portion slides across the length as the storage compartment pivots about the first axis fore and aft with respect to the front end.

13. The shopping cart of claim 12 wherein the second portion includes legs extending laterally from the bottom support and the rear frame further includes a vertical slot formed thereon, the legs slidably inserted through the slot having the length along which the legs slide.

* * * * *